United States Patent

[11] 3,572,608

[72] Inventor Rudolf Schultz
Berlin, Germany
[21] Appl. No. 813,867
[22] Filed Apr. 7, 1969
[45] Patented Mar. 30, 1971
[73] Assignee Deutsche Angelgerate Manufaktur (DAM)
Kantze Gesellschaft mit beschrankter
Haftung & Co.
Kommanditgesellschaft, Berlin, Germany
[32] Priority June 19, 1968
[33] France
[31] 155,544

[54] FISHING REEL
2 Claims, 2 Drawing Figs.
[52] U.S. Cl. .................................................... 242/218
[51] Int. Cl. ................................................. A01k 89/00
[50] Field of Search ........................................... 242/84.54,
84.45, 84.44

[56] References Cited
UNITED STATES PATENTS
2,925,964 2/1960 Holahan .................... 242/84.54
3,326,492 6/1967 Murvall ..................... 242/84.45
3,451,638 6/1969 Moat ......................... 242/84.45

Primary Examiner—Stanley N. Gilreath
Attorney—Richards & Geier

ABSTRACT: A fishing reel has a driving shaft for the wind-up roller. A handle is screwed upon the shaft and the inner end of the shaft carries a wheel frictionally driving the wind-up roller. This wheel can be connected by a coupling with a hollow shaft provided with a one way lock freely movable in the winding direction. The coupling is opened by a rearward turning of the handle. The invention is particularly characterized in that the handle is screwed upon a threaded outer end of the driving shaft and that the driving shaft is connected with the hollow shaft by a transverse pin so as to prevent relative turning but with small axial play.

Patented March 30, 1971

3,572,608

Inventor:
R. Schultz
By Richards & Geier
ATTORNEYS

FISHING REEL

This invention relates to a fishing reel. The invention is particularly concerned with a fishing reel having a driving shaft for the wind-up roller. A handle is screwed upon the shaft and the inner end of the shaft carries a wheel frictionally driving the wind-up roller. This wheel can be connected by a coupling with a hollow shaft provided with a one-way lock freely movable in the winding direction. The coupling is opened by the rearward turning of the handle.

A fishing reel of this construction is provided with a braking resistance operable during the winding of the fishing line which can be made adjustable. When a caught fish tries to escape, excessive pulling can break the fishing line. To prevent this, the releasable coupling can free the fishing line subject to a small braking resistance. It is desirable to have available the originally set braking force when the pull exerted by the fish slackens and the winding of the fishing line is resumed.

In existing fishing reels this is attained by making the driving shaft of two parts which are interconnected by a claw coupling, the coupling being released when the handle is turned rearwardly. In that case the drop in the braking force caused by turning back the handle is dependent upon the brake setting of the coupling, so that if the brake is set too highly an excessive load upon the fishing line is still possible despite the possible diminution of the braking force.

According to another existing construction the handle is rigidly connected with one section of the driving shaft and the two sections of the driving shaft are interconnected by screw threads. The drawback of this construction consists in the return release of the coupling by the unimpeded rotation of the end connected with the wind-up roller independent from the actuation of the handle, since the parts of the driving shaft rotate relatively to each other. Thus the release of the coupling is not determined by the fisherman any more, and furthermore the basic setting of the braking force is falsified. The location of stops provided for limiting the rotation of the two parts of the driving shaft during the rearward movement of the handle, is also affected so that after a certain operational time period a complete release of the coupling becomes impossible.

An object of the present invention is to eliminate the drawbacks of existing constructions and to provide a fishing reel of simple structure which can be advantageously manufactured.

Other objects of the present invention will become apparent in the course of the following specification.

In the accomplishment of the objectives of the present invention it was found desirable to provide a construction wherein the handle is screwed upon screw threads provided upon the outer end of the driving shaft which is connected with the hollow shaft by a transverse pin in a manner preventing relative turning but with small axial play.

This construction assures the release of the coupling under all circumstances and will provide a diminution of resistance against the pulling off of the fishing line immediately at the beginning of the rearward turning of the handle, while the initial setting of the braking force is restored when the fishing line is being wound up again. It is also of advantage that when an adjustable brake is used, its release takes place independently of its setting.

According to a further embodiment of the present invention the danger that the handle may be unintentionally unscrewed from the driving shaft, is avoided by providing a ratchet coupling freely rotatable in the winding direction and located between the pin and the outer end of the driving shaft. One part of the coupling is mounted upon the driving shaft so that it can not rotate but is movable axially and is pressed by a spring in the direction toward the outer end of the driving shaft. The other part of the coupling is freely rotatably mounted upon the driving shaft and includes a groove extending coaxially to the driving shaft over a part of the circumference. The groove is engaged by a block which is mounted upon a threaded pin screwed into the handle.

The invention will appear more clearly from the detailed description when taken in connection with the accompanying drawing, showing, by way of example only, a preferred embodiment of the inventive idea.

Figure 1:
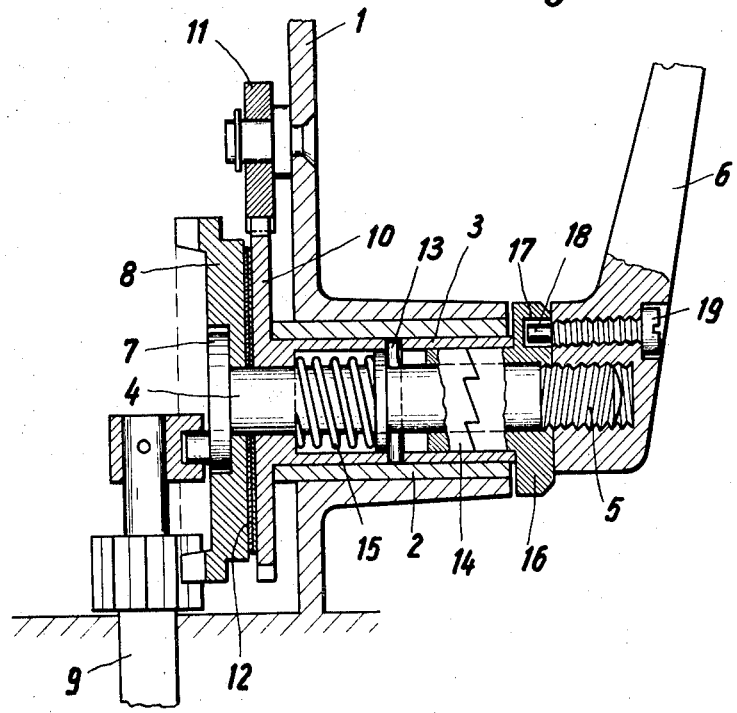
FIG. 1 is a section through a fishing reel constructed in accordance with the present invention.
Figure 2:
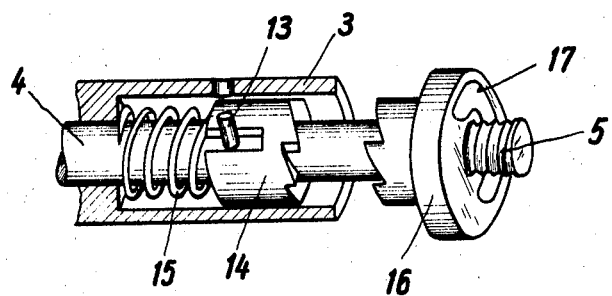
FIG. 2 is partly a sectional and partly a perspective view of some of the parts shown in FIG. 1, the parts being illustrated as being separated from each other.

The fishing reel shown in the drawing has a casing 1 provided with a hub containing a bearing bush 2 which encloses a hollow shaft 3. A driving shaft 4 is mounted in the hollow shaft 3.

The outer end of the driving shaft 4 carries screw threads 5 upon which a handle 6 is threaded. The inner end of the driving shaft 4 is provided with a disc 7 and a wheel 8 which is moved by friction. The wheel 8 is connected with a shaft 9 which drives the wind-up roller (not shown).

A locking disc 10 is mounted upon the inner end of the hollow shaft 3. The disc 10 cooperates with a one-way lock 11 which is mounted in the casing 1 and rotates freely in the winding direction. The disc 10 is coupled with the wheel 8 by friction coupling 12, which receives its coupling pressure by screwing the handle 6 upon the screw threads 5.

The driving shaft 4 is connected with the hollow shaft by a transverse pin 13, so that the two shafts rotate jointly. However a small axial play is provided, to take into consideration the elasticity of the coupling 12.

When the handle 6 is turned rearwardly upon the screw threads 5, the coupling pressure of the coupling 12 is diminished and then the pin 13 prevents a rotation of the driving shaft 4 by frictional connection with the wheel 8, since the hollow shaft 3 is prevented from rotation by the one-way lock 11. This prevents the return screwing of the screw threads 5.

A ratchet coupling which rotates freely in the winding direction, is provided for the purpose of limiting the rearward rotation of the handle 6. This coupling has a part 14 which is slidably mounted upon the driving shaft 4 but which is prevented from rotating relatively thereto by a pin 13. A spring 15 presses the coupling part 14 in the direction toward the outer end of the driving shaft 4 and toward the other part 16 of the ratchet coupling. The part 16 is freely rotatably mounted upon the driving shaft 4 and upon one side is provided with a groove 17 extending coaxially to the shaft 4 over a part of the circumference. A block 18 extends into the groove 17. The block 18 is mounted upon a threaded pin 19 which is screwed into the handle 6.

When the handle 6 is turned rearwardly, it can move only until the block 18 is pressed against the end of the groove 17. The coupling part 16 does not participate in this movement. During the winding operation, the ratchet coupling runs freely to facilitate the closing of the coupling 12.

I claim:

1. In a fishing reel, a driving shaft for a fishing line, said shaft having a threaded outer end, a handle screwed upon said outer end, a hollow shaft enclosing said driving shaft, a pin carried by said driving shaft and projecting with axial play into said hollow shaft, a disc fixed upon said hollow shaft, a one-way lock engaging said disc for permitting said disc to rotate in the direction for winding a fishing line and to lock said disc against rotation in the direction when unwinding a fishing line, and coupling means connecting said disc with said driving shaft.

2. A fishing reel in accordance with claim 1, comprising a ratchet coupling located between said pin and said outer end of the driving shaft and freely rotatable in the winding direction, said ratchet coupling having a part mounted upon said driving shaft and rotatable solely with said driving shaft, said part being axially movable upon said driving shaft, a spring engaging said part and pressing it toward said outer end of the driving shaft, and another part mounted upon said driving shaft and rotatable relatively thereto, said other part having a groove extending coaxially to the driving shaft over a part of the circumference thereof, a block projecting into said groove, and a threaded pin screwed into said handle and carrying said block.